(12) United States Patent
Yoon

(10) Patent No.: US 12,308,377 B2
(45) Date of Patent: May 20, 2025

(54) ELECTRODE ASSEMBLY AND METHOD FOR MANUFACTURING THE SAME

(71) Applicant: LG ENERGY SOLUTION, LTD., Seoul (KR)

(72) Inventor: Dong Sik Yoon, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 805 days.

(21) Appl. No.: 17/470,180

(22) Filed: Sep. 9, 2021

(65) Prior Publication Data
US 2021/0408572 A1  Dec. 30, 2021

Related U.S. Application Data

(63) Continuation of application No. PCT/KR2020/005564, filed on Apr. 28, 2020.

(30) Foreign Application Priority Data

May 3, 2019 (KR) .......................... 10-2019-0052505

(51) Int. Cl.
  *H01M 10/42* (2006.01)
  *H01M 10/04* (2006.01)

(52) U.S. Cl.
  CPC ....... *H01M 10/0431* (2013.01); *H01M 10/42* (2013.01); *H01M 2010/4292* (2013.01)

(58) Field of Classification Search
  CPC ..... H01M 2010/4292; H01M 10/0431; H01M 10/42

(Continued)

(56) References Cited

U.S. PATENT DOCUMENTS

| 6,258,478 B1 | 7/2001 | Kim |
| 6,329,097 B1 | 12/2001 | Kim |

(Continued)

FOREIGN PATENT DOCUMENTS

| CN | 1230035 A | 9/1999 |
| JP | 2007-80795 A | 3/2007 |

(Continued)

OTHER PUBLICATIONS

Machine Translation of KR20060010656A cited in IDS from Global Dossier (Year: 2006).*

(Continued)

*Primary Examiner* — Maria Laios
*Assistant Examiner* — Zackary Richard Cochenour
(74) *Attorney, Agent, or Firm* — Birch, Stewart, Kolasch & Birch, LLP

(57) ABSTRACT

A method for manufacturing an electrode assembly including an N/P ratio examination step (S1) of determining whether an N/P ratio is to be maintained within a predetermined range, the N/P ratio representing a ratio of a loading amount of a positive electrode active material to a loading amount of a negative electrode active material per unit area, an adjustment request area selecting step of selecting an adjustment request area that is expected to have an N/P ratio beyond the predetermined range, and an active material adjusting step in which at least one of a loading amount of the negative electrode active material or a loading amount of the positive electrode active material on a corresponding area of each of a negative electrode and a positive electrode which are to be positioned in the adjustment request area is increased or decreased with respect to a loading amount loaded on other areas.

7 Claims, 6 Drawing Sheets

(58) Field of Classification Search
USPC .......................................................... 429/209
See application file for complete search history.

(56) References Cited

U.S. PATENT DOCUMENTS

| | | | |
|---|---|---|---|
| 2010/0104930 | A1 | 4/2010 | Kim et al. |
| 2012/0258343 | A1 | 10/2012 | Takahata et al. |
| 2013/0143090 | A1 | 6/2013 | Hosoya et al. |
| 2013/0302699 | A1 | 11/2013 | He et al. |
| 2015/0111078 | A1 | 4/2015 | Hosoya et al. |
| 2015/0340731 | A1* | 11/2015 | Kim .................. H01M 4/525 |
| | | | 429/246 |
| 2016/0156061 | A1 | 6/2016 | Hosoya et al. |
| 2020/0067063 | A1* | 2/2020 | Chen .................. H01M 50/461 |

FOREIGN PATENT DOCUMENTS

| | | |
|---|---|---|
| JP | 2007-242519 A | 9/2007 |
| JP | 2012-174579 A | 9/2012 |
| JP | 2012-174582 A | 9/2012 |
| JP | WO2011-074098 A1 | 4/2013 |
| JP | 2013-140781 A | 7/2013 |
| JP | 2014-175164 A | 9/2014 |
| JP | 2015-109135 A | 6/2015 |
| JP | 2018-195500 A | 12/2018 |
| KR | 10-1999-0066181 A | 8/1999 |
| KR | 10-2000-0042975 A | 7/2000 |
| KR | 10-2000-0056302 A | 9/2000 |
| KR | 10-2005-0121512 A | 12/2005 |
| KR | 10-2006-0010656 A | 2/2006 |
| KR | 10-2008-0087686 A | 10/2008 |
| KR | 10-2013-0103202 A | 9/2013 |
| KR | 10-2015-0049519 A | 5/2015 |
| KR | 10-2015-0134162 A | 12/2015 |
| KR | 10-2017-0019054 A | 2/2017 |
| KR | 20170030791 A * | 3/2017 |

OTHER PUBLICATIONS

Machine Translation of Jp 2015109135A cited in IDS from espacenet (Year: 2015).*
International Search Report (PCT/ISA/210) issued in PCT/KR2020/005564 mailed on Aug. 14, 2020.
Extended European Search Report for European Application No. 20801933.1, dated Mar. 9, 2022.

* cited by examiner

ELECTRODE ASSEMBLY AND METHOD FOR MANUFACTURING THE SAME

CROSS-REFERENCE TO RELATED APPLICATION

The present application is a Continuation of PCT International Application No. PCT/KR2020/005564, filed on Apr. 28, 2020, which claims the benefit of the priority of Korean Patent Application No. 10-2019-0052505, filed on May 3, 2019, all of which are hereby expressly incorporated by reference into the present application.

TECHNICAL FIELD

The present invention relates to an electrode assembly in which a negative electrode, a separator, and a positive electrode are repeatedly stacked on each other, and more specifically, to: a method for manufacturing an electrode assembly capable of suppressing the occurrence of imbalance in N/P ratio between the negative electrode and the positive electrode (a dose ratio of active materials per unit area between the negative electrode and the positive electrode), thereby preventing deterioration in battery performance and life; and an electrode assembly manufacturable through the method.

BACKGROUND ART

Batteries for storing energy are generally classified into a primary battery and a secondary battery. The primary battery is a disposable consumable battery, but on the other hand, the secondary battery is a rechargeable battery which is manufactured by using a material in which oxidation and reduction processes between current and a substance are repeatable. That is, when the reduction reaction to the material is performed by the current, power is recharged. Also, when the oxidation reaction to the material is performed, the power is discharged. Such recharging and discharging may be performed repeatedly.

Among various types of secondary batteries, a lithium secondary battery is generally manufactured by mounting to a case an electrode assembly in which a positive electrode (cathode), a separator, and a negative electrode (an anode) are stacked. The recharging and discharging of the lithium secondary battery are performed while lithium ions are intercalated into the negative electrode from lithium metal oxide of the positive electrode and deintercalated therefrom repeatedly.

The electrode assembly is generally provided as one electrode assembly, which is obtained by: stacking a predetermined number of unit cells, each unit cell having a three-layered stack structure of positive electrode/separator/negative electrode, a five-layered stack structure of positive electrode/separator/negative electrode/separator/positive electrode or negative electrode/separator/positive electrode/separator/negative electrode, or a stack structure of five or more layers; or repeatedly stacking an individual unit cell of positive electrode/separator/negative electrode. Also, such an electrode assembly is accommodated in a case such as a cylindrical can or a prismatic pouch.

Also, a winding type, a stacking type, and a stacking and folding type are well-known as a method for manufacturing the electrode assembly. In the winding type, a separator is stacked between the negative electrode and the positive electrode and then rolled. In the stacking type, a negative electrode and a positive electrode are cut into desired width and length and then the negative electrode, a separator, and the negative electrode are repeatedly stacked. In the stack and folding type, unit cells are placed on a folding separator and then folded from one side.

Among them, in the winding type (a jelly-roll-type) electrode assembly, the positive electrode, the separator, and the negative electrode are stacked and mounted on a winding core, and then the mounting core rotates. Thus, the positive electrode, the separator, and the negative electrode are wound around the circumference of the mounting core to manufacture the electrode assembly. Also, when is inserted into the cylindrical can, the electrode assembly is inserted while maintaining a cylindrical shape. On the other hand, when is inserted into the pouch, the electrode assembly is manufactured such that, as illustrated in FIG. 1, an end portion has a curved section curved at a predetermined curvature, and a central portion (pressed at a predetermined pressure) has a flat section.

However, in the electrode assembly having the curved section and the flat section, the flat section has no defect due to non-uniformity in loading level between the positive electrode 10 and the negative electrode 20 [that is, a loading amount (an application amount) of a positive electrode active material 10b applied onto a positive electrode collector 10a and a loading amount of a negative electrode active material 20b applied onto a negative electrode collector 20a are maintained at appropriate levels], but, the curved section has imbalance in N/P ratio (a dose ratio of active materials per unit area between the negative electrode and the positive electrode) at a specific ratio due to a difference in radii of curvature. Such imbalance may cause deterioration in battery performance and life.

DISCLOSURE OF THE INVENTION

Technical Problem

Thus, main objectives of the present invention are to provide: a method for manufacturing an electrode assembly capable of preventing imbalance in an N/P ratio from occurring in a curved section of the electrode assembly; and an electrode assembly manufactured through the method.

Technical Solution

In order to achieve the above-described objectives, the present invention provides a method for manufacturing an electrode assembly, and an electrode assembly manufactured through the method.

According to the present invention, provided is a method for manufacturing an electrode assembly in which a negative electrode having a negative electrode active material loaded on a surface of a negative electrode collector, a separator, and a positive electrode having a positive electrode active material loaded on a surface of a positive electrode collector are repeatedly stacked on each other, the method comprising: an N/P ratio examination step of determining whether an N/P ratio, which is a ratio of a loading amount of the negative electrode active material to a loading amount of the positive electrode active material per unit area, is to be maintained within a predetermined range in a region in which the negative electrode and the positive electrode face each other when stacked; an adjustment request area selecting step of selecting an adjustment request area that is expected to have an N/P ratio beyond the predetermined range; and an active material adjusting step in which at least one of a loading amount of the negative electrode active material or a loading amount of the positive electrode active material on a corresponding area of each of the negative electrode and the positive electrode which are to be positioned in the adjustment request area is increased or decreased with respect to a loading amount loaded on other areas of the negative electrode and the positive electrode.

In the active material adjusting step, when each of the loading amount of the negative electrode active material and the loading amount of the positive electrode active material increases or decreases, the loading amount of one of the negative electrode active material and the positive electrode active material decreases, and the loading amount of the other of the negative electrode active material and the loading amount of the positive electrode active material increases.

Alternatively, in the active material adjusting step, when only one of the loading amount of the negative electrode active material or the loading amount of the positive electrode active material increases or decreases, the loading amount of the other of the negative electrode active material or the positive electrode active material is maintained to be equal to the loading amount in the other areas.

Also, in the adjustment request area selecting step, at least two adjustment request areas are selected, and an adjusted loading amount to be applied to each of the adjustment request areas is individually determined.

When the negative electrode, the separator, and the positive electrode are folded in a stacked state and manufactured into the electrode assembly (a case in which the electrode assembly is manufactured into a jelly roll structure), a curved section to be curved when the negative electrode and the positive electrode are folded is selected as the adjustment request area in the adjustment request area selecting step. Here, when the curvatures of curved sections change according to the number of folding and winding, the adjusted loading amount to be applied to each of the curved sections may be determined individually.

In the manufacturing method of the present invention, when the loading amount of one of the negative electrode active material or the positive electrode active material changes during one of a process of loading the negative electrode active material on the surface of the negative electrode collector or a process of loading the positive electrode active material on the surface of the positive electrode collector, in the N/P ratio examination step, it is determined that the N/P ratio is to be beyond the predetermined range from a point where the loading amount changes, in the adjustment request area selecting step, when the negative electrode and the positive electrode are stacked, a corresponding area facing a loading amount changing area on which the loading amount of the one of the negative electrode active material and the positive electrode active material changes is selected as the adjustment request area, wherein the corresponding area is an area on which the other of the negative electrode active material and the positive electrode active material is to be loaded, and in the active material adjusting step, the loading amount of the other increases or decreases in the adjustment request area to correspond to the changing loading amount of the one of the negative electrode active material and the positive electrode active material so that the N/P ratio is maintained within a certain range.

Also, when a difference in thickness occurs because the loading amount of the negative electrode active material or the positive electrode active material which is loaded on the adjustment request area in the active material adjusting step is less than the loading amount on the other areas, the method may further comprise a step (S4) of attaching a tape to the adjustment request area to offset the difference in thickness.

Furthermore, the present invention further provides an electrode assembly which may be manufactured through the manufacturing method described above.

According to the present invention, provided is an electrode assembly in which a negative electrode having a negative electrode active material loaded on a surface of a negative electrode collector, a separator, and a positive electrode having a positive electrode active material loaded on a surface of a positive electrode collector are repeatedly stacked on each other, the electrode assembly comprising: a flat section in which the negative electrode and the positive electrode are parallel to each other in a flat surface shape; and a curved section which has a curved shape due to folding of the negative electrode and the positive electrode and is connected to an end of the flat section, wherein a loading amount of at least one of the negative electrode active material or the positive electrode active material which is loaded on the curved section is greater or less than a loading amount of each of the negative electrode active material and the positive electrode active material which are loaded on the flat section.

In the electrode assembly, an N/P ratio, which is a ratio of the loading amount of the negative electrode active material to the loading amount of the positive electrode active material per unit area, is uniformly maintained within a certain range between the curved section and the flat section.

Also, according to the present invention, provided is an electrode assembly in which a negative electrode having a negative electrode active material loaded on a surface of a negative electrode collector, a separator, and a positive electrode having a positive electrode active material loaded on a surface of a positive electrode collector are repeatedly stacked on each other, wherein one of the negative electrode or the positive electrode has an active material change area in which a loading amount of the negative electrode active material or the positive electrode active material is beyond a predetermined range, the other of the negative electrode and the positive electrode has an adjustment request area in a region facing the active material change area, and the loading amount of the negative electrode active material or the positive electrode active material in the adjustment request area increases or decreases to correspond to the active material change area so that an N/P ratio, which is a ratio of the loading amount of the negative electrode active material to the loading amount of the positive electrode active material per unit area between the negative electrode and the positive electrode, is maintained within a certain range.

A tape may be attached to the active material change area to form a flat surface from a surface on which the negative electrode active material or the positive electrode active material is loaded.

Advantageous Effects

The manufacturing method of the present invention having the above-described configurations may uniformly maintain the N/P ratio between the positive electrode and the negative electrode, and thus the deterioration in battery performance and life may be suppressed to improve the performance and commercial value of the final product (the secondary battery) on which the electrode assembly is mounted.

In the manufacturing method of the present invention, when each of the loading amounts of the negative electrode active material and the positive electrode active material increase or decrease in the active material adjusting step, both the negative electrode active material and the positive electrode active material may be adjusted. However, only one of the negative electrode active material and the positive electrode active material may be adjusted, and thus the manufacturing process may be simplified.

Also, the adjustment request areas are individually determined in the adjustment request area selecting step, and thus, the N/P ratio may be uniformly maintained within the predetermined range with respect to each of the curved sections.

Furthermore, in the manufacturing method of the present invention, when the loading amount of one of the negative electrode active material and the positive electrode active material changes, the loading amount of the other changes according to the loading amount of the one, and thus, the defect occurrence rate may be suppressed.

Also, when the difference in thickness occurs because the loading amount of the negative electrode active material or the positive electrode active material which is loaded on the adjustment request area in the active material adjusting step is less than the loading amount on the other areas, the tape may be additionally attached to offset the difference in thickness.

MODE FOR CARRYING OUT THE INVENTION

Hereinafter, the present invention will be described in detail with reference to the accompanying drawings so that the present invention can be easily carried out by a person skill in the art to which the present invention pertains. However, the present invention may be embodied in several different forms, and not be limited to the embodiments set forth herein.

A part unrelated to the description will be omitted so as to clearly describe the present invention, and the same reference symbols are affixed to identical or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to: a method for manufacturing an electrode assembly capable of preventing imbalance in N/P ratio from occurring in a curved section C of the electrode assembly; and an electrode assembly manufactured through the method. Hereinafter, embodiments of the present invention will be described in more detail with reference to the accompanying drawings.

First Embodiment

The present invention provides, as a first embodiment, a method for manufacturing an electrode assembly having a uniform N/P ratio.

Figure 1:
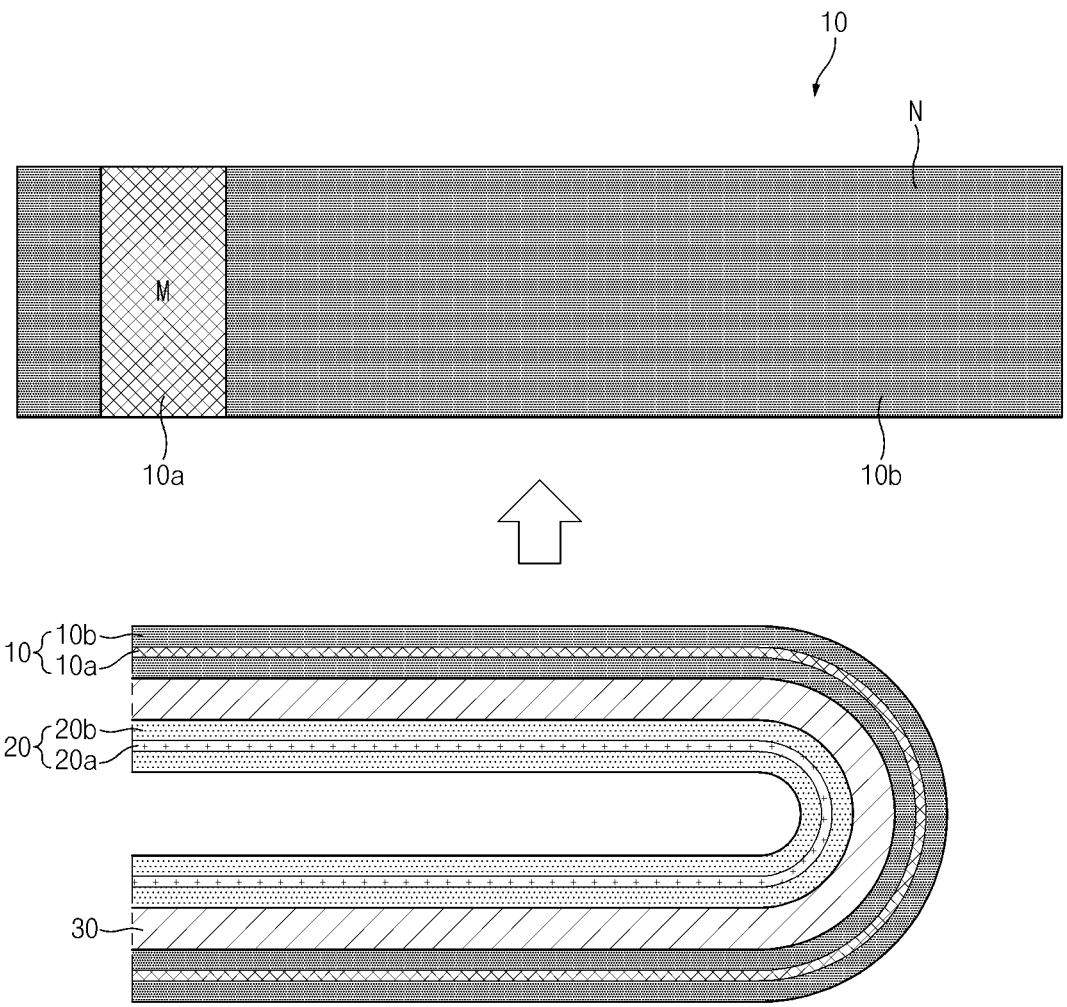
FIG. 1 is a view illustrating: a state in which a positive electrode, a separator, and a negative electrode are stacked and folded to form a curved section and a flat section; and a flat shape of the positive electrode before an electrode tab is processed.
Figure 2:
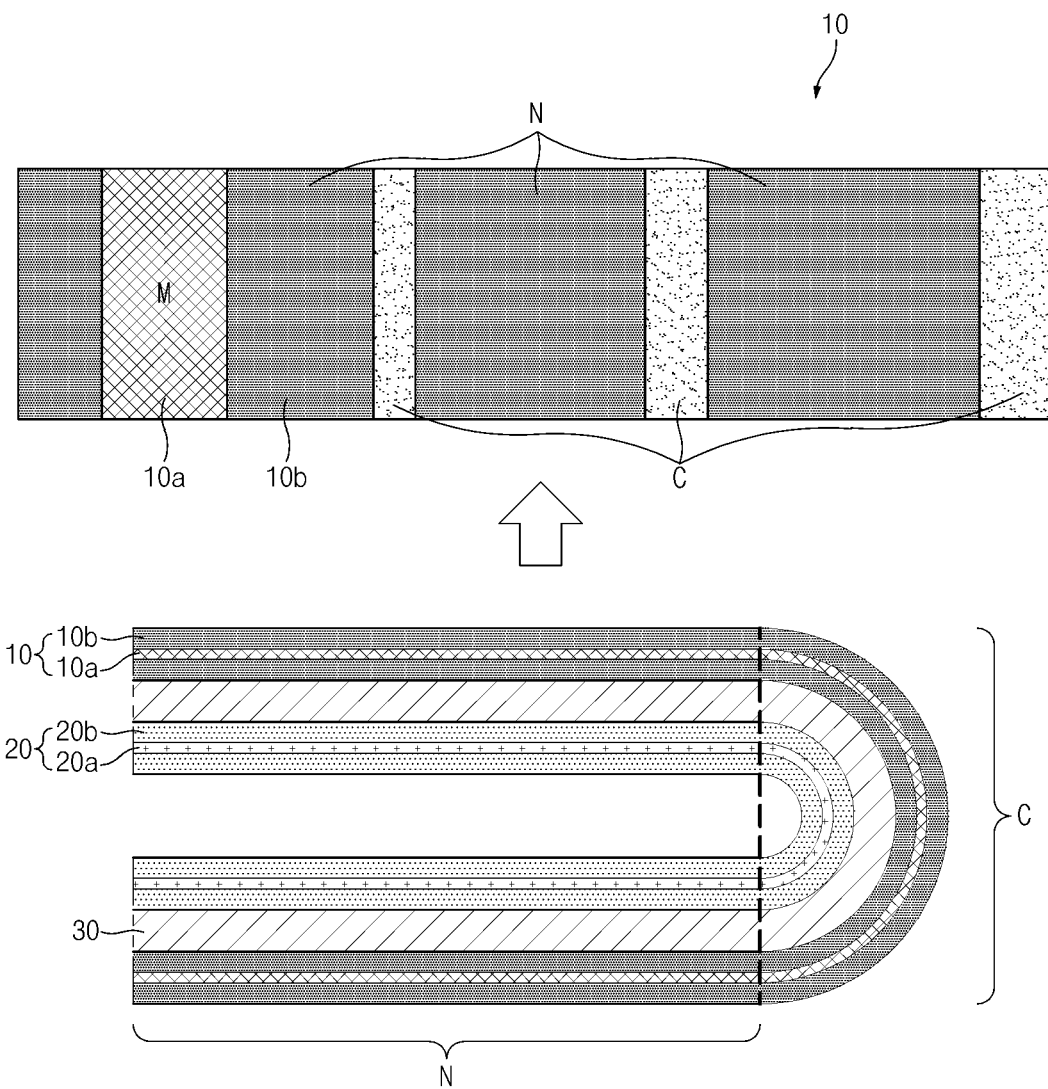
FIG. 2 is a view illustrating: a state in which a positive electrode, a separator, and a negative electrode are stacked and folded to form a curved section C and a flat section N; and a flat shape of the positive electrode in which an adjustment request area is selected according to the present invention, and a loading amount of a positive electrode active material is adjusted.

As illustrated in FIG. 2 showing a state in which a positive electrode 10, a separator 30, a negative electrode 20 are stacked and folded to form a curved section C and a flat section N, a manufacturing method according to the embodiment provides a method for manufacturing an electrode assembly having the curved section C. An adjustment request area is selected in the negative electrode 20 and/or the positive electrode 10, and a loading amount of a positive electrode active material 10b and/or a negative electrode active material 20b is adjusted.

Figure 6:
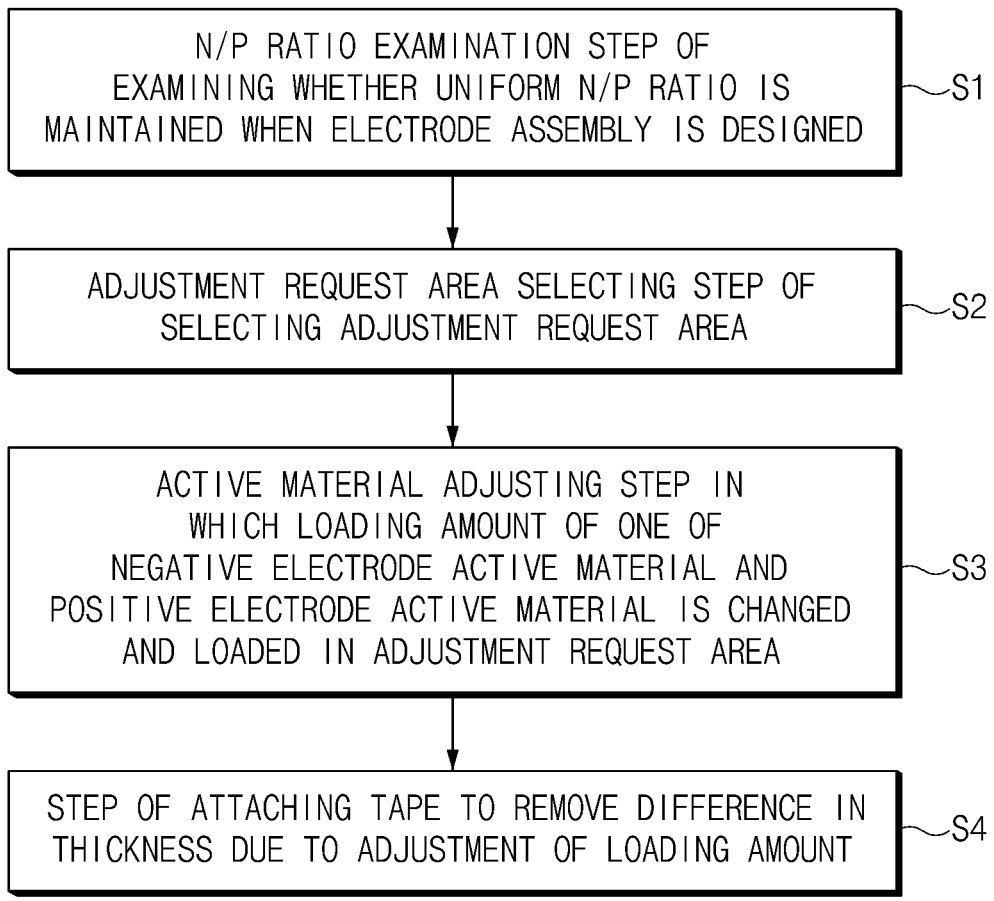
FIG. 6 is a flow chart showing an order of steps according to a manufacturing method of the present invention.

Referring to FIG. 6 showing an order of steps according to the manufacturing method of the present invention, the embodiment comprises an N/P ratio examination step (S1), an adjustment request area selecting step (S2), and an active material adjusting step (S3).

In the N/P ratio examination step (S1), whether or not an N/P ratio is to be maintained within a predetermined range is determined. Here, the N/P ratio represents a ratio of a loading amount of the negative electrode active material to a loading amount of the positive electrode active material per unit area in a region in which the negative electrode 20 and the positive electrode 10 face each other when stacked. The predetermined range may be 1 or more. When the N/P ratio is less than 1, the negative electrode loading amount may be too small and lithium precipitation may occur. However, as the N/P ratio increases, capacity loss may also increases. Therefore, the predetermined range is preferably between 1 and 1.5, and, more preferably, between 1 and 1.2.

As illustrated in FIG. 2, in the curved section C in which the negative electrode 20, the positive electrode 10, and the separator 30 are folded, a facing ratio of the positive electrode active material 10b to the negative electrode active material 20b changes due to a difference in curvatures between the positive electrode 10 and the negative electrode 20. Thus, in the curved section C, lithium ions coming from the positive electrode active material 10b may not be properly intercalated into the negative electrode 20, and thus, a surplus amount of lithium ions remains. This surplus amount is precipitated or moved to the flat section N, causing deterioration in battery performance.

Thus, in this step, it is determined whether or not to adjust the active material according to the difference in radii of curvature between the negative electrode 20 and the positive electrode 10.

Figure 3:
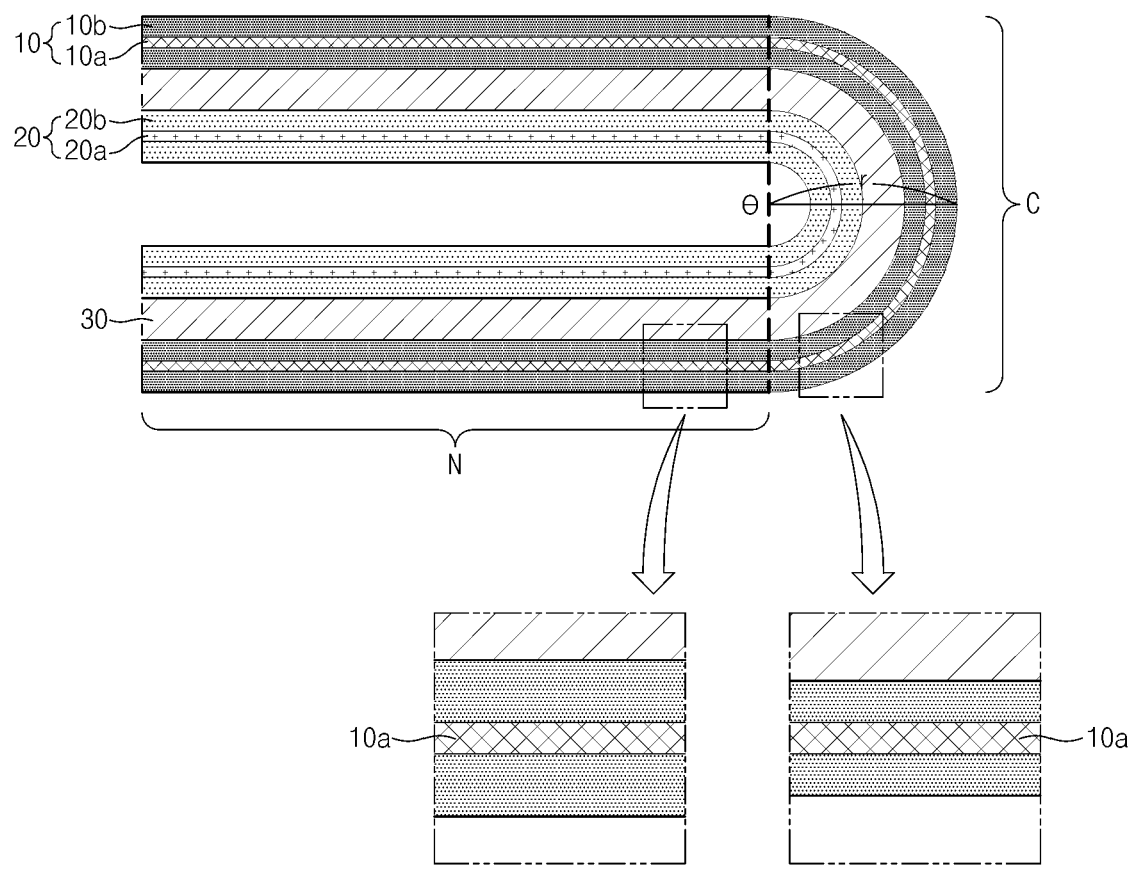
FIG. 3 shows an enlarged view of a portion in which a positive electrode active material is applied on a flat section and an enlarged view of a portion in which a positive electrode active material is applied on a curved section where a loading amount of a positive electrode active material is adjusted.

Also, when the active material is required to adjust, an area that is expected to have an N/P ratio beyond the predetermined range is selected as an adjustment request area in the adjustment request area selecting step (S2). Referring to FIG. 3 showing an enlarged view of a portion in which the positive electrode active material 10b is applied on the flat section and N and an enlarged view of a portion in which the positive electrode active material 10b is applied on the curved section C where a loading amount of the positive electrode active material 10b is adjusted, when an angle of a curved section is θ, a radius is r, and a length of an arc of the curved section is l in the curved section C, the length of the arc is calculated from l=θr.

Because the positive electrode active material 10b is applied (loaded) onto an area corresponding to the length of the arc, it may be determined whether or not the adjustment of the loading amount of the active material is necessary by calculating as a capacity per area (mAh/mm$^2$), a capacity per weight (mAh/mg), and a capacity per unit volume (mAh/cc).

For example, a radius r of an innermost curved section of the positive electrode 10 becomes closer to a straight line. However, as the number of winding (rotating in a state in which the positive electrode, the separator, and the negative electrode are stacked) increases, a value of the radius r may increase.

With the above-described calculation, it is possible to calculate that, from which curved section, adjustment of a loading amount is necessary. Also, adjustment areas may be selected when the positive electrode (or the negative electrode) is manufactured (before the positive electrode active material is loaded on the positive electrode collector). An upper figure of FIG. 2 shows a state in which curved sections C are selected as adjustment request areas. For reference, an area M in which the positive electrode active material 10b is not applied in the positive electrode collector 10a is an area to be processed into a positive electrode tab. Also, areas indicated by N are areas that become flat sections and are zones in which adjustment of an active material is not required, and areas indicated by C are areas that become curved sections and areas in which adjustment of an active material is required. As illustrated, from the left to the right in the drawing, the curved section is configured such that an area of C increases as the radius r increases.

When adjustment request areas are selected, an amount of the active material to be loaded on each of the adjustment request areas is calculated and determined by using the calculated values of the capacity per area, the capacity per weight, and the capacity per unit area.

After the amount of the negative electrode active material 20b or the positive electrode active material 10b to be applied in each of the adjustment request areas is determined, the active material adjusting step (S3) is performed, in which an adjusted amount is applied when the positive electrode active material 10b is loaded on the positive electrode collector 10a and/or when the negative electrode active material 20b is loaded on the negative electrode collector 20a. The N/P ratio examination step (S1), the adjustment request area selecting step (S2), and the active material adjusting step (S3) may be performed on only one of the negative electrode and the positive electrode and performed on both the negative electrode and the positive electrode.

In the active material adjusting step (S3), each of a loading amount of the negative electrode active material 20b and a loading amount of the positive electrode active material 10b on a corresponding area of each of the negative electrode 20 and the positive electrode 10 which are to be positioned in the adjustment request area may be allowed to increase or decrease with respect to a loading amount loaded on the other areas.

Alternatively, in the active material adjusting step (S3), when each of the loading amount of the negative electrode active material 20b and the loading amount of the positive electrode active material 10b increases or decreases, the loading amount of one of the negative electrode active material 20b or the positive electrode active material 10b may decrease, and the loading amount of the other may increase. Also, in the active material adjusting step (S3), when each of the loading amounts of the negative electrode active material 20b and the loading amount of the positive electrode active material 10b increases or decreases, the loading amount of one of the negative electrode active material 20b or the positive electrode active material 10b may be maintained to be equal to the loading amount in the other areas, and the loading amount of the other may increase or decrease.

As described above, at least two adjustment request areas are selected, and an adjusted loading amount to be applied to each of the adjustment request areas is individually determined.

In a case in which the electrode assembly is manufactured into a jelly roll structure as in the embodiment, the curved section C to be curved when the negative electrode 20 and the positive electrode 10 are folded is selected as the adjustment request area in the adjustment request area selecting step (S2). Here, when the curvatures of the curved sections change according to the number of folding and winding, the adjusted loading amount to be applied to each of the curved sections may be determined individually.

Second Embodiment

Also, when an insulating tape is attached between a non-coating portion of the positive electrode 10 (an area in which an active material is not applied on a collector and which is to be processed into an electrode tab and a coating portion (an area in which the active material is applied on the collector) or attached on a positive electrode tab processed in the non-coating portion) to prevent a short circuit in addition to when the electrode assembly having the jelly roll structure is manufactured, the manufacturing method according to the present invention may prevent lithium precipitation by setting a corresponding area of the negative electrode, which comes into contact with the insulating tape, as an adjustment request area.

That is, according to the related art, movement of lithium ions is blocked in a portion T on which an insulating tape is attached, and the lithium ions are not accommodated into a negative electrode 20, which may cause the precipitation. However, the present invention provides, as a second embodiment, a manufacturing method in which a surface of a negative electrode facing a positive electrode on which an insulating tape is attached is selected as an adjustment request area to adjust a negative electrode active material 20b.

Figure 4:
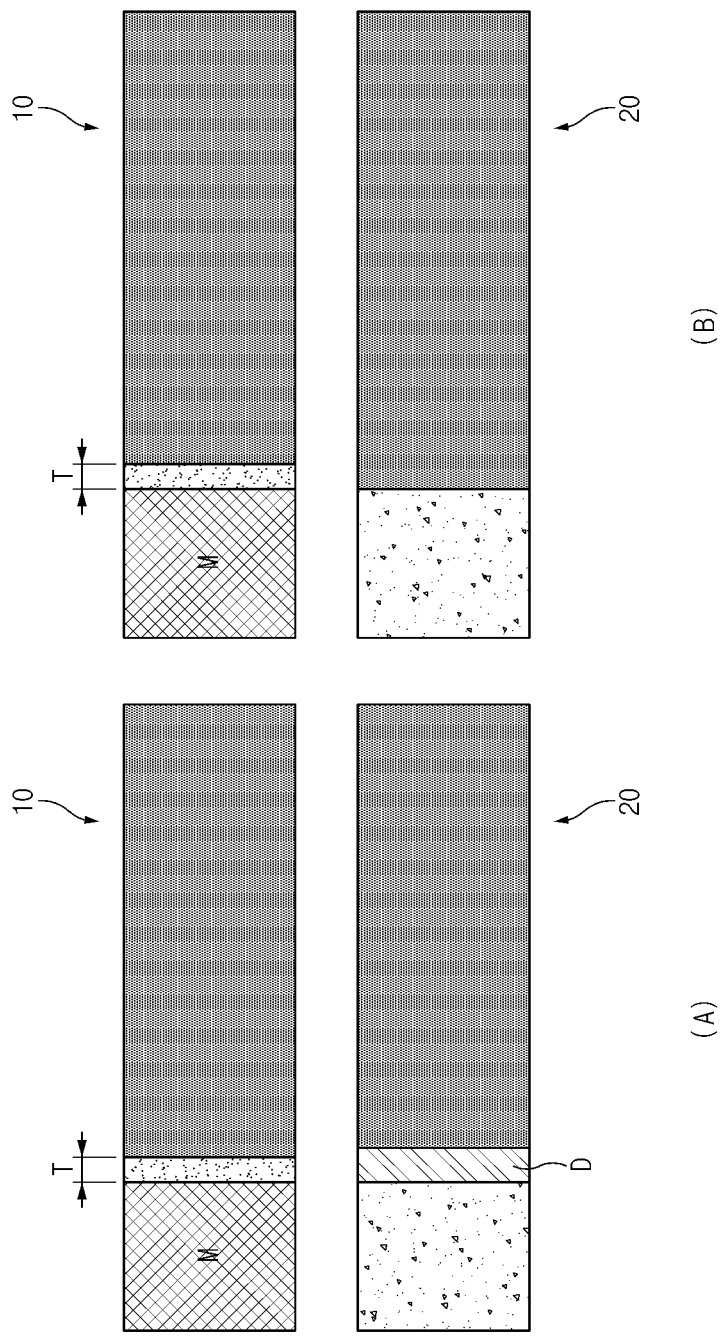
FIG. 4 shows: a state (A) of a portion D in which lithium is precipitated on a surface of a negative electrode facing an area T of a positive electrode on which an insulating tape is attached; and a state (B) in which a loading amount of a negative electrode active material is adjusted on the surface of the negative electrode facing the area T of the positive electrode on which the insulating tape is attached, and thus, the lithium is not precipitated thereon.

FIG. 4 illustrates: a state (A) manufactured according to the manufacturing method of the related art and showing a portion D in which lithium is precipitated on a surface of a negative electrode facing an area T of a positive electrode 10 on which an insulating tape is attached; and a state (B) manufactured according to the embodiment of the present invention and showing that a loading amount of a negative electrode active material is adjusted on a surface of a negative electrode facing an area T of a positive electrode 10 on which the insulating tape is attached, and thus, the lithium is not precipitated thereon. In the manufacturing method of the embodiment, a corresponding position of a negative electrode 20 facing insulating film when the insulating film is attached on the positive electrode 10 is selected as an adjustment request area (here, a corresponding area of the positive electrode on which the insulating tape is attached may also be selectively selected as an adjustment request area).

In the adjustment request area, the exchange of lithium ions may hardly occur. The adjustment request area, which is selected to maintain a uniform N/P ratio between the negative electrode and the positive electrode with respect to a neighboring portion, may be manufactured so that minimum negative electrode active material and positive electrode active material are loaded.

That is, in the manufacturing method according to the embodiment, when the loading amount of one of a negative electrode active material 20b or a positive electrode active material 10b changes during one of a process of loading the negative electrode active material 20b on a surface of a negative electrode collector 20a or a process of loading the positive electrode active material 10b on a surface of a positive electrode collector 10a, it is determined in the N/P ratio examination step that the N/P ratio is to be beyond a predetermined range from a point where the loading amount changes. As described above, it may be determined that the N/P ratio is to be beyond an allowable range in the area on which the insulating tape is attached.

Also, in addition to the above-described case, in a case in which a defect occurs when an electrode active material is applied to an electrode which is manufactured first among the negative electrode and the positive electrode, the manufacturing method of the present invention may be used for the electrode which is manufactured later, thereby resolving the defect.

Figure 5:
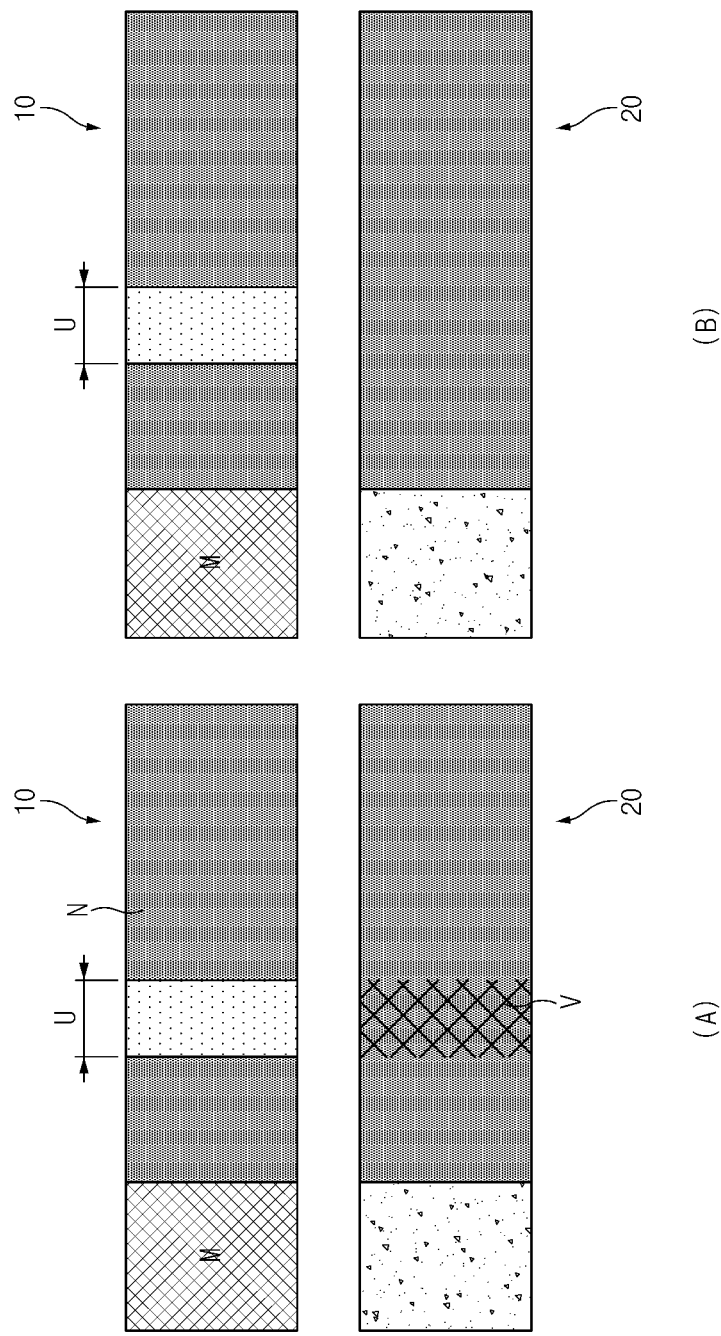
FIG. 5 shows: a state (A) in which lithium is precipitated on a facing position V of a negative electrode which faces a position U in which a positive electrode active material is incorrectly applied thicker or thinner; and a state (B) in which the facing position of the negative electrode, which faces the position U in which the positive electrode active material is incorrectly applied thicker or thinner, is selected as an adjustment request area, and an application amount of a negative electrode active material is adjusted according to an application amount of the positive electrode active material, thereby not causing lithium precipitation.

FIG. 5 shows: a state (A) in which lithium is precipitated on a facing position V of a negative electrode which faces a position U in which a positive electrode active material is incorrectly applied thicker or thinner; and a state (B) in which a facing position of a negative electrode, which faces a position U in which a positive electrode active material is incorrectly applied thicker or thinner, is selected as an adjustment request area, and an application amount of a negative electrode active material is adjusted according to an application amount of the positive electrode active material, thereby not causing lithium precipitation.

As illustrated in FIG. 5, in a case in which an application amount is excessively small or large on a specific area U when a positive electrode is manufactured, for example, when a positive electrode active material 10b is loaded on a positive electrode collector 10a, an N/P ratio changes on the facing position V of the negative electrode facing the corresponding area, and thus, a defect such as lithium precipitation may occur.

However, according to the present invention, a corresponding area of the negative electrode facing the specific area U of the positive electrode on which the application is incorrectly performed is selected as the adjustment request area, and an amount of the negative electrode active material is adjusted and applied according to a ratio of the positive electrode active material. Thus, the uniform N/P ratio may be maintained.

Thus, according to the embodiment, in the adjustment request area selecting step, when the negative electrode and the positive electrode are stacked, a corresponding area facing an loading amount changing area on which the loading amount of the one of the negative electrode active material and the positive electrode active material changes may be configured to be selected as the adjustment request area, wherein the corresponding area is an area on which the other of the negative electrode active material and the positive electrode active material is to be loaded. Also, in the active material adjusting step, the loading amount of the other of the negative electrode active material and the positive electrode active material may be configured to increase or decrease in the adjustment request area to correspond to the changing loading amount of the one of the negative electrode active material and the positive electrode active material so that the N/P ratio is maintained within a certain range.

Also, when the loading amount loaded on the adjustment request area in the active material adjusting step is small, a step (S4) of attaching a tape to the adjustment request area may be further provided to offset a difference in thickness with other areas (as illustrated in FIG. 6).

Third Embodiment

Also, the present invention provides, as a third embodiment, an electrode assembly which may be manufactured through the manufacturing method according to the first embodiment.

As illustrated in FIG. 2, an electrode assembly according to the embodiment of the present invention is an electrode assembly in which a negative electrode 20 having a negative electrode active material 20b loaded on a surface of a negative electrode collector 20a, a separator 30, and a positive electrode 10 having a positive electrode active material 10b loaded on a surface of a positive electrode collector 10a are repeatedly stacked on each other, the electrode assembly comprising: a flat section N in which the negative electrode 20 and the positive electrode 10 are parallel to each other in a flat surface shape; and a curved section C which has a curved shape due to folding of the negative electrode 20 and the positive electrode 30 and is connected to an end of the flat section N.

Also, as described above, since an N/P ratio in the curved section C changes according to the difference in radii of curvature between the negative electrode 20 and the positive electrode 10, the curved section C is selected as the adjustment request area, and the loading amount of the negative electrode active material 20b and the positive electrode active material 10b may be adjusted according to the method described above.

Thus, the loading amount of at least one of the negative electrode active material 20b or the positive electrode active material 10b which is loaded on the curved section C is greater or less than the loading amount of each of the negative electrode active material 20b and the positive electrode active material 10b which are loaded on the flat section N. Therefore, in the electrode assembly, an N/P ratio, which is a ratio of the loading amount of the negative electrode active material 10b to the loading amount of the positive electrode active material 20b per unit area, is uniformly maintained within a certain range between the curved section C and the flat section N.

Fourth Embodiment

Also, the present invention provides, as a fourth embodiment, an electrode assembly which may be manufactured through the manufacturing method according to the second embodiment.

An electrode assembly according to the embodiment is an electrode assembly in which a negative electrode 20 having a negative electrode active material 20b loaded on a surface of a negative electrode collector 20a, a separator 30, and a positive electrode 10 having a positive electrode active material 10b loaded on a surface of a positive electrode collector 10a are repeatedly stacked on each other. One of the negative electrode 20 and the positive electrode 10 has an active material change area in which a loading amount of the negative electrode active material 20b or the positive electrode active material 10b is beyond a predetermined range. That is, as illustrated in FIG. 4, the active material change area occurs when the insulating tape is attached as illustrated in FIG. 4 or when the abnormality occurs during a coating process of an active material as illustrated in FIG. 5.

The other of the negative electrode and the positive electrode has an adjustment request area in a region facing the active material change area, and the loading amount of the negative electrode active material 20b or the positive electrode active material 10a in the adjustment request area increases or decreases to correspond to the active material change area so that an N/P ratio, which is a ratio of the loading amount of the negative electrode active material to the loading amount of the positive electrode active material per unit area between the negative electrode and the positive electrode, is maintained within a certain range.

Also, a tape is attached to the active material change area to form a flat surface from a surface on which the negative electrode active material or the positive electrode active material is loaded.

The manufacturing method of the present invention having the above-described configurations may uniformly maintain the N/P ratio between the positive electrode 10 and the negative electrode 20, and thus, the deterioration in battery performance and life may be suppressed to improve the commercial value of the product.

In the manufacturing method of the present invention, when each of the loading amounts of the negative electrode active material 20b and the positive electrode active material 10b increase or decrease in the active material adjusting step, both the negative electrode active material 20b and the positive electrode active material 10b may be adjusted. However, only one of them may be adjusted, and thus the manufacturing process may be simplified.

Also, the adjustment request areas are individually determined in the adjustment request area selecting step, and thus, the N/P ratio may be uniformly maintained within the predetermined range with respect to each of the curved sections C.

Furthermore, in the manufacturing method of the present invention, when the loading amount of one of the negative electrode active material 20b or the positive electrode active material 10b changes, the loading amount of the other changes according to the loading amount of the one, and thus, the defect occurrence rate may be suppressed.

Also, when the difference in thickness occurs because the loading amount of the negative electrode active material 20b or the positive electrode active material 10b which is loaded on the adjustment request area in the active material adjusting step is less than the loading amount on the other areas, the tape may be additionally attached to offset the difference in thickness.

Although the present invention is described by specific embodiments and drawings, the present invention is not limited thereto, and various changes and modifications may be made by a person skilled in the art to which the present invention pertains within the technical idea of the present invention and equivalent scope of the appended claims.

The invention claimed is:

1. A method for manufacturing an electrode assembly in which a negative electrode having a negative electrode active material loaded on a surface of a negative electrode collector, a separator, and a positive electrode having a positive electrode active material loaded on a surface of a positive electrode collector are stacked on each other, the method comprising:
   an N/P ratio examination step of determining whether an N/P ratio, which is a ratio of a loading amount of the negative electrode active material to a loading amount of the positive electrode active material per unit area, is to be maintained within a predetermined range in a region in which the negative electrode and the positive electrode face each other when stacked;
   an adjustment request area selecting step of selecting an adjustment request area that is expected to have an N/P ratio beyond the predetermined range; and
   an active material adjusting step in which at least one of a loading amount of the negative electrode active material or a loading amount of the positive electrode active material on a corresponding area of each of the negative electrode and the positive electrode which are to be positioned in the adjustment request area is increased or decreased with respect to a loading amount loaded on other areas of the negative electrode and the positive electrode,
   wherein a difference in thickness occurs because the loading amount of the negative electrode active material or the positive electrode active material which is loaded on the adjustment request area in the active material adjusting step is less than the loading amount on the other areas, and
   the method further comprises a step of attaching a tape in the width direction to the adjustment request area to offset the difference in thickness.

2. The method of claim 1, wherein, in the active material adjusting step,
   when each of the loading amount of the negative electrode active material and the loading amount of the positive electrode active material increases or decreases,
   the loading amount of one of the negative electrode active material and the positive electrode active material decreases, and the loading amount of the other of the negative electrode active material and the positive electrode active material increases.

3. The method of claim 1, wherein, in the active material adjusting step, when only one of the loading amount of the negative electrode active material or the loading amount of the positive electrode active material increases or decreases, the loading amount of the other of the negative electrode active material or the positive electrode active material is maintained to be equal to the loading amount in the other areas.

4. The method of claim 1, wherein, in the adjustment request area selecting step, at least two adjustment request areas are selected, and an adjusted loading amount to be applied to each of the adjustment request areas is individually determined.

5. The method of claim 1, wherein, when the negative electrode, the separator, and the positive electrode are folded in a stacked state and manufactured into the electrode assembly, a curved section to be curved when the negative electrode and the positive electrode are folded is selected as the adjustment request area in the adjustment request area selecting step.

6. The method of claim 1, wherein, when the loading amount of one of the negative electrode active material or the positive electrode active material changes during one of a process of loading the negative electrode active material on the surface of the negative electrode collector or a process of loading the positive electrode active material on the surface of the positive electrode collector, in the N/P ratio examination step, it is determined that the N/P ratio is to be beyond the predetermined range from a point where the loading amount changes, in the adjustment request area selecting step, when the negative electrode and the positive electrode are stacked, a corresponding area facing a loading amount changing area on which the loading amount of the one of the negative electrode active material and the positive electrode active material changes is selected as the adjustment request area, wherein the corresponding area is an area on which the other of the negative electrode active material and the positive electrode active material is to be loaded, and in the active material adjusting step, the loading amount of the other of the negative electrode active material and the positive electrode active material increases or decreases in the adjustment request area to correspond to the changing loading amount of the one of the negative electrode active material and the positive electrode active material so that the N/P ratio is maintained within a certain range.

7. An electrode assembly in which a negative electrode having a negative electrode active material loaded on a surface of a negative electrode collector, a separator, and a positive electrode having a positive electrode active material loaded on a surface of a positive electrode collector are stacked on each other, the electrode assembly comprising:

a flat section in which the negative electrode and the positive electrode are parallel to each other in a flat surface shape; and a curved section which has a curved shape due to folding of the negative electrode and the positive electrode and is connected to an end of the flat section, wherein a loading amount of at least one of the negative electrode active material or the positive electrode active material which is loaded on the curved section is greater or less than a loading amount of each of the negative electrode active material and the positive electrode active material which are loaded on the flat section, and wherein an N/P ratio, which is a ratio of the loading amount of the negative electrode active material to the loading amount of the positive electrode active material per unit area, is uniformly maintained within a certain range between the curved section and the flat section.

* * * * *